(12) United States Patent
Perry (10) Patent No.: US 6,728,273 B2
(45) Date of Patent: Apr. 27, 2004

(54) ULTRASHORT-PULSE LASER MACHINING SYSTEM EMPLOYING A PARAMETRIC AMPLIFIER

(75) Inventor: Michael D. Perry, Poway, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/918,579

(22) Filed: Jul. 31, 2001

(65) Prior Publication Data

US 2002/0001321 A1 Jan. 3, 2002

Related U.S. Application Data

(63) Continuation-in-part of application No. 08/859,020, filed on May 20, 1997, now Pat. No. 6,621,040.

(51) Int. Cl.[7] .............................. H01S 3/98; H01S 3/10; H01S 3/13
(52) U.S. Cl. .............................. 372/18; 372/30; 372/21; 359/330; 359/332; 359/340; 359/345; 359/347; 359/348; 359/337
(58) Field of Search .............................. 372/18, 30, 21; 359/330, 332, 340, 345, 347, 348, 337

(56) References Cited

U.S. PATENT DOCUMENTS

| 5,592,327 | A | * | 1/1997 | Gabl et al. ................. 359/348 |
| 5,720,894 | A | * | 2/1998 | Neev et al. .................. 216/65 |
| 6,181,463 | B1 | * | 1/2001 | Galvanauskas et al. ..... 359/330 |

* cited by examiner

Primary Examiner—George Eckert
Assistant Examiner—Joseph Nguyen
(74) Attorney, Agent, or Firm—John Wooldridge; Alan H. Thompson (57) ABSTRACT

A method and apparatus are provided for increasing the energy of chirped laser pulses to an output in the range 0.001 to over 10 millijoules at a repetition rate 0.010 to 100 kHz by using a two stage optical parametric amplifier utilizing a bulk nonlinear crystal wherein the pump and signal beam size can be independently adjusted in each stage.

64 Claims, 4 Drawing Sheets

ULTRASHORT-PULSE LASER MACHINING SYSTEM EMPLOYING A PARAMETRIC AMPLIFIER

This is a continuation in-part of U.S. patent application Ser. No. 08/859,020, titled "Ultrashort Pulse Laser Machining of Metals and Alloys" filed May 20, 1997 now Pat.No. 6,621,040 and incorporated herein by reference.

The United States Government has rights in this invention pursuant to contact No. W-7405-ENG-48 between the United States Department of Energy and the University of California for the operation of Lawrence Livermore National Laboratory.

BACKGROUND OF THE INVENTION

1. Field of the Invention

The present invention relates to the field of ultrashort pulse duration laser systems suitable for material and biological tissue processing, and more specifically, it relates to the use of a parametric amplifier in ultrashort pulse duration laser systems.

2. Description of Related Art

U.S. Pat. No. 5,720,894, incorporated herein by reference, teaches a method of material processing with high repetition rate, ultrashort-pulse lasers. The patent discloses that any material can be machined with micron scale precision with essentially no thermal or shock damage to the remaining material. A general laser apparatus and method are described which enable this high precision machining performance. A particular embodiment of a laser apparatus utilizing Titanium-doped sapphire as the laser material is described in this reference.

Most laser systems capable of achieving high repetition rate (>100 Hz), ultrashort-pulse duration (<1 psec) and moderate pulse energy (>0.1 mJ) realized to date are based on Titanium-doped sapphire as the laser gain material. Recently, a few systems employing Ytterbium-doped materials and Neodymium-doped glass as the laser gain material have been introduced which achieve picosecond and subpicosecond pulse durations and repetition rates in the range 0.1 to 10 kHz. These systems employ a technique known as chirped-pulse amplification in which a low energy, ultrashort laser pulse is stretched in time prior to amplification. The stretched pulse is amplified by a factor of $\sim 10^6$–$10^7$ in a high gain amplifier (typically a regenerative amplifier) and then recompressed to near its original pulse duration. A regenerative amplifier is a complex, multipass laser amplifier that requires sophisticated, high-speed electro-optical systems for pulse switching.

Each of these approaches exhibit problems that limit their use for materials processing applications. For Titanium-sapphire systems, the low upper-state lifetime (2 $\mu$sec) of the laser material in the high gain amplifier requires that the material be excited (pumped) by a secondary laser. This requirement of a secondary laser system results in a significant increase in the complexity of the system and makes the system sensitive to alignment between the pump laser and the high gain amplifier. Furthermore, the overall electrical to optical conversion efficiency of the system is very low.

For Neodymium-doped glass and Ytterbium-doped materials, the low gain cross section results in the requirement that the laser system be operated at either high fluence (>4 J/cm$^2$) or in a multipass configuration (such as a regenerative amplifier) for efficient extraction of the energy stored within the laser medium. In chirped-pulse amplification laser systems, this requirement results in a high peak power density (>5 GW/cm$^2$) on the optics within the laser that often results in damage to the optical components.

In all these systems, achieving moderate average power output (>1 W) with high beam quality is complicated by thermal distortion and depolarization associated with temperature gradients within the laser material. These gradients result from the residual energy left in the material from the quantum defect between the energy of the photons that excite the laser medium and the energy of the photons in the extracted laser beam.

U.S. Pat. No. 5,400,350, titled "Method And Apparatus For Generating High Energy Ultrashort Pulses," incorporated herein by reference, is directed to providing compact systems and methods for producing and amplifying chirped pulses to provide high-energy ultrashort pulses. The invention is further directed to providing a compact system that is reliable and cost effective to fabricate. The patent seeks to show that relatively compact tunable lasers can be used to directly generate long chirped optical pulses. For example, compact monolithic semiconductor lasers, which have relatively small dimensions (e.g., dimensions smaller than large frame solid state lasers) and which permit their emission wavelength to be tuned (i.e., changed) relatively fast during the generation of an optical pulse, can be used. These pulsed sources eliminate any need for bulk components in the cavity of, for example, a mode-locked femtosecond laser. The relatively long chirped optical pulses can subsequently be amplified in plural amplification stages to increase their energy content. The patent seeks to show that amplification in plural stages can be achieved by suppressing spontaneous emission between the stages. Afterwards, the amplified pulses can be recompressed. The reference teaches the use of a quasi-phase matched optical parametric amplifier based on periodically poled lithium-niobate for amplifying chirped pulses. This is an alternative approach to the use of high gain laser amplifiers in chirped-pulse laser systems. High gain is achieved by the use of quasi-phase matching. However, the use of periodically poled lithium niobate limits the system to relatively low average power (<1 W) and low pulse energy (typically less than 0.5 mJ).

SUMMARY OF THE INVENTION

It is an object of the present invention to provide a method and apparatus for increasing the energy of chirped laser pulses to an output in the range 0.001 to over 10 millijoules at a repetition rate 0.010 to 100 kHz by using an optical parametric amplifier comprised of bulk crystalline material exhibiting a nonlinear susceptibility.

It is another object of the present invention to provide a method and apparatus for increasing the energy of chirped laser pulses to an output in the range 0.001 to over 10 millijoules at a repetition rate 0.010 to 100 kHz by using a double-pass optical parametric amplifier comprised of a single nonlinear crystal; wherein the pump and signal beam size can be independently adjusted on each pass through the crystal.

Still another object of the invention is to achieve the above objects through the use of nonlinear crystals made of nonlinear material from a family of borates including Beta-Barium borate, lithium borate and others exhibiting a second order nonlinear susceptibility.

Another object of the invention is to achieve the above objects through the use of nonlinear crystals made of nonlinear material from a family of phosphates including potassium-dihydrogen phosphate (KDP), potassium titanyl phosphate and others exhibiting a second order nonlinear susceptibility.

These and other objects will be apparent based on the disclosure herein.

The invention is a laser machining system employing an optical parametric amplifier capable of producing pulses at repetition rates in the range 0.1 to 100 kHz with pulse durations in the range 0.01 to 20 psec. By utilizing a bulk nonlinear material and a short-pulse (<3 nsec) pump laser, pulses with energy in the range 0.01 to 10 millijoules can be produced from a compact ultrashort-pulse laser machining system.

Bulk optical parametric amplifiers have not been considered to date for moderate to high average power, ultrashort-pulse applications. The present optical parametric amplifier system does not rely on quasi-phase matching and can achieve both high average power and high gain for broad bandwidth chirped-pulses from a single or double stage system. By relying on parametric conversion rather than conventional laser amplification, there is no residual energy left within the gain medium. As a result, there are negligible thermal gradients and hence, one eliminates the depolarization and beam distortion problems that severely impact the beam quality and electrical to optical conversion efficiency of high average power ultrashort-pulse lasers. In addition to eliminating many of the thermal management problems associated with the high gain amplifier, the use of a parametric amplifier enables the production of the necessary ultrashort duration pulses from a simplified and more compact system. The pulses exiting the parametric amplifier may be compressed directly and used for machining or surgery or may be further amplified in a conventional laser amplifier to provide additional pulse energy before compression.

Any ultrashort-pulse laser machining system could employ the invention to produce a simplified and more compact laser system with improved thermo-optical performance. The invention is a critical step toward realizing compact, and industrially hardened ultrashort-pulse lasers for machining and medical (e.g., surgical) applications.

DETAILED DESCRIPTION OF THE INVENTION

Bulk optical parametric amplifiers hold promise for high average power and high gain. Such systems have not been considered to date for moderate to high average power (>0.1 W), ultrashort-pulse (0.01 to 20 psec) applications. The invention disclosed herein teaches a design for an optical parametric amplifier system which does not rely on quasi-phase matching and can achieve both high average power and high gain for broad bandwidth chirped-pulses from a single stage or double stage system. By relying on parametric conversion rather than conventional laser amplification there is no residual energy left within the gain medium. As a result, there are negligible thermal gradients and hence, one eliminates the depolarization and beam distortion problems that severely impact the beam quality and electrical to optical conversion efficiency of high average power ultrashort-pulse lasers.

In addition to eliminating many of the thermal management problems associated with the high gain amplifier, the use of a parametric amplifier enables the production of the necessary ultrashort-pulse duration pulses from a simplified and more compact system. The pulses exiting the parametric amplifier may be compressed directly and used for machining or surgery or may be further amplified in a conventional laser amplifier to provide additional pulse energy before compression.

Figure 1:
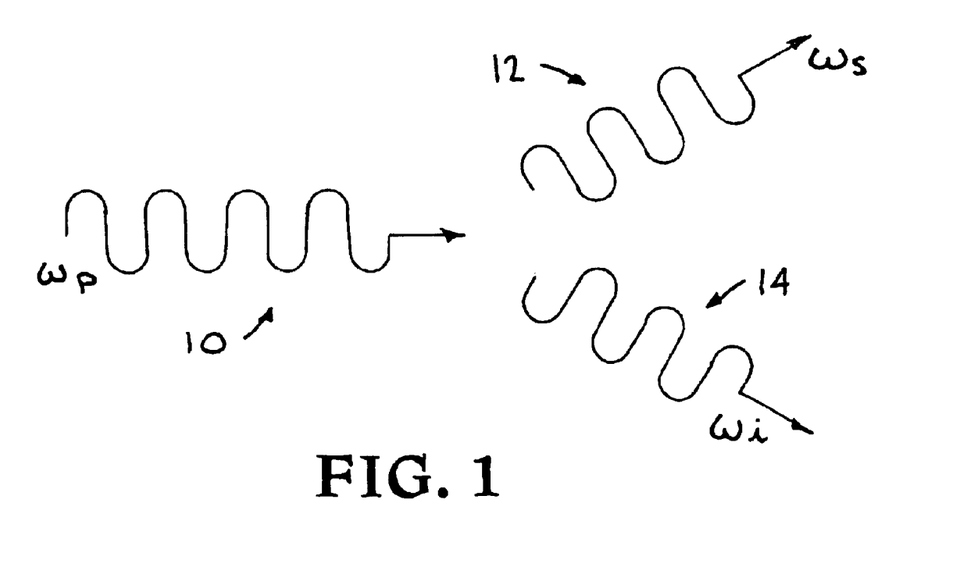
FIG. 1 is an illustrative drawing of the process of difference frequency generation.

Optical parametric amplifiers are based on the phenomenon of difference frequency generation in which a pump and signal beam interact in a nonlinear crystal via the second order nonlinear susceptibility to transfer energy from the pump to the signal. The basis of optical parametric amplification is now well established and has been described by several authors (e.g., see Y. R. Shen, "The Principles of Nonlinear Optics," Wiley, 1984 and references therein). As depicted in FIG. 1, in difference frequency generation, a pump photon 10 of frequency, $\omega_p$, is converted into a signal photon 12 of frequency, $\omega_s$, and an idler of frequency 14, $\omega_I$. Energy conservation requires that $\omega_p = \omega_s + \omega_I$.

Optical parametric amplification refers explicitly to the process in which a signal beam of a particular polarization enters a nonlinear crystal, at a particular angle with respect to the axis of the nonlinear crystal in such a manner to extract energy from the pump beam via difference frequency generation. The angle and polarization are determined by the requirement to conserve momentum between the pump, signal and idler photons, i.e., $k_p = k_s + k_I$, where the magnitude of the wavevector is given by $k = 2\pi n/\lambda$. This process is known by those skilled in the art as phase matching.

Figure 2:
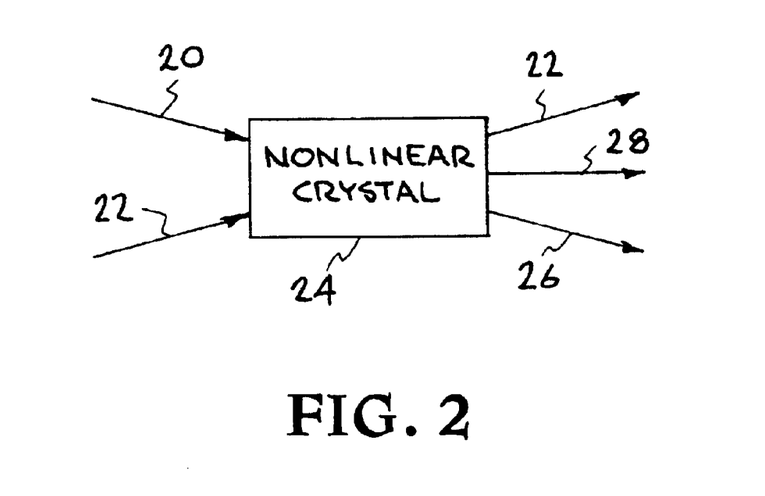
FIG. 2 shows an arrangement of pump and signal beams in optical parametric amplification.
Figure 3:
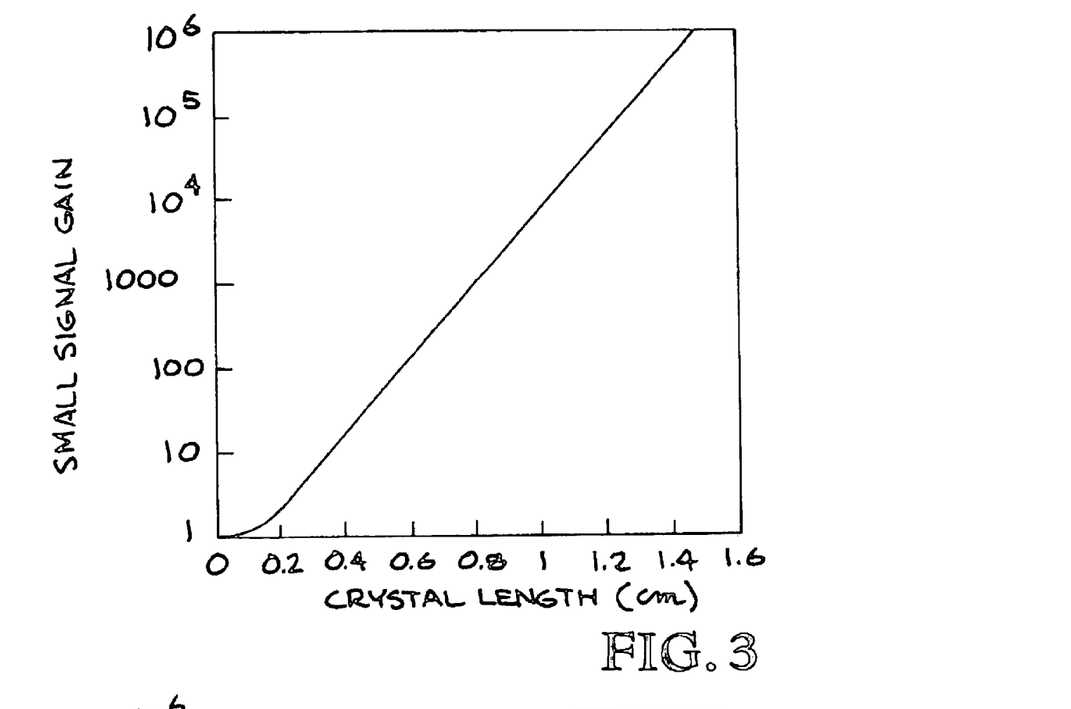
FIG. 3 shows small signal gain at 1064 nm in a Beta-Barium Borate (BBO) crystal cut for Type I phase matching as a function of crystal length at 532 nm. The calculation assumes plane wave propagation with no depletion of the pump and no geometrical walk-off. Pump pulse duration =3 nsec and pump irradiance=1 GW/cm$^2$.

The nonlinear crystal may be selected from a host of materials exhibiting a nonlinear susceptibility, $\chi^{(2)}$. Example materials that have been used include, Potassium Titanyl Phosphate (KTP), Lithium Borate (LBO), Beta-Barium Borate (BBO), Lithium Niobate, Potassium Dihydrogen Phosphate (KDP), and Gadolinium-YCOB. As shown in FIG. 2, the optical parametric amplifier is configured by directing a signal beam 20 and a pump beam 22 at the face of the nonlinear crystal 24. Since the transfer of energy from the pump beam 22 to the amplified signal beam 26 is dependent upon both the irradiance of the pump beam and the interaction length within the crystal, the size of the pump beam 22 must be adjusted to produce the optimum balance between irradiance and interaction length. FIG. 2 also shows the idler beam 28 exiting the nonlinear crystal 24. Typically, small signal parametric gains of several thousand can be achieved when the product of the pump irradiance and interaction length, $I_pL$, is in the range, 0.1 to approximately 2 GW/cm. Although other combinations will produce parametric amplification, adjusting the pump beam to produce a peak irradiance in the range 0.1 to $1 \times 10^9$ W/cm$^2$ produces excellent results in the nonlinear materials referred to previously. While the crystal length must be optimized to achieve maximum gain without reconversion of energy back into the pump beam, crystal lengths in the range 0.5 to 2 cm will perform adequately with the range of pump irradiance described previously. This is illustrated in FIG. 3 where the small signal parametric gain is plotted as a function of crystal length in Beta-Barium Borate. A specific configuration would be the use of a BBO crystal of length 15 mm cut for type I or type II phase matching pumped by 532 nm light at an irradiance of $4 \times 10^8$ W/cm$^2$. Since this irradiance should be maintained over the full length of the crystal, the spot size can be estimated from the Rayleigh range of a TEM$_{00}$ laser beam, $z_0 = 2\pi w_o^2/\lambda$, where, $w_o$ is the radius of the beam at the $1/e^2$ irradiance point and $\lambda$ is the wavelength of the pump beam. For non-TEM$_{00}$ laser beams, these same rules will hold, but are adjusted by the M$^2$ formalism, e.g., the beam quality can be described by a parameter, M$^2$ such that the beam will propagate approximately as a Gaussian beam but with a minimum waist of $w_{actual} = M^2 w_o$. Robust performance is attained by equating approximately one-half the Rayleigh range to the crystal length, $L = z_0/2 = \pi w_o^2/\lambda$. For $\lambda = 532$ nm and equating the Rayleigh range to the one-half the length of the crystal ($z_0/2 = L = 15$ mm), these conditions can be produced by adjusting a TEM$_{00}$ beam to a waist of approximately $2w_o = 100$ microns.

Unfortunately, the pump beam must be larger than this minimum size due principally to three factors: 1) geometrical walk-off between the pump and signal beam, 2) curvature of the wavefront and, 3) gain guiding. Geometrical walk-off refers to the fact that under most conditions, there will be a slight angle difference between the pump and signal beams in order to get both beams into the crystal. Furthermore, due to the requirement to adjust the propagation angle relative to the crystal axis to achieve the phase matching condition described previously, the pump and signal beams will propagate through the crystal at different angles. The second phenomenon, curvature of the wavefront, refers to the fact that the plane wave approximation is not sufficiently accurate for phase matching of real beams in a focused geometry. The finite curvature of the wavefront results in incomplete phase matching (i.e., $\Delta k \neq 0$ even when the angles are set for perfect phase matching). Finally, gain guiding, refers to the intensity dependent gain profile. Since the center of the pump beam exhibits a higher irradiance than the outer edges, the signal beam will be preferentially amplified in the center of the pump beam. To avoid significant distortion of the signal beam and account for geometrical walk-off, for most phase-matching conditions, the pump beam waist should be approximately 1.5 to 3 times the beam waist of the signal, $w_p \approx (2-3) \times w_s$. As a result, it is recommended that the signal beam waist be set such that one-half the Rayleigh range of the signal is approximately equal to the crystal length, $z_s/2 = L$. Once this is set, the pump beam waist should then be adjusted to $w_p \approx (2-3) \times (w_s)$. In the example above, if a 1064 nm signal (M$^2 = 1$) were being amplified in a 15 mm long BBO crystal, the signal beam waist would be set to $2w_s \approx 150$ microns and the pump beam would be set to $2.5w_p \approx 375$ microns.

The required pump power must be determined. To achieve an irradiance×length product of $\approx 0.6$ GW/cm (for BBO), a pump irradiance $\approx 400$ MW/cm$^2$ for the 15 mm long crystal is required. For a beam waist of $2w_p \approx 375$ microns, the peak power of the pump must therefore be approximately, $P_{pump} = (I_{pump}/2) \times \pi w_p^2 \approx 230$ kW. For a 3 nsec duration pump pulse, the required energy in a single pump pulse would be therefore approximately 0.7 mJ. These estimates are for perfect TEM$_{00}$ pump and signal beams in a plane wave approximation. For beams with an M$^2 > 1$, one must increase the energy in the pump beam by a factor of approximately M$^4$. Note that these estimates are for operation of the parametric amplifier in the limit of negligible depletion of the pump beam. When conversion of approximately more than 10 percent of the energy in the pump beam to the signal and idler occurs, the crystal length and the net gain will be reduced. It is for this reason, that the present invention utilizes a system that employs two gain stages when optimum conversion efficiency is desired. Either two separate crystals and/or a single crystal are arranged such that the pump and signal beams make two passes through the crystal. The first pass is optimized for high gain as described previously, while the second pass (or second stage) is optimized for high conversion efficiency of pump energy to energy in the signal beam (FIGS. 4 and 5).

In optical parametric amplifiers, there is no gain of the signal if there is no pump present at the time of the signal. Hence, for efficient utilization of the laser energy available from the pump, the duration of the pump pulse and the signal pulse should be approximately equal. However, in order to avoid temporal distortion of the signal pulse, a pump pulse that has a duration equal to approximately twice that of the signal is recommended. Avoiding temporal distortion is particularly important for chirped-pulse amplification systems where temporal distortion of the signal pulse results in spectral distortion that may limit the ability to recompress the pulse after amplification. The stretched pulse duration in most chirped-pulse amplified system is in the range 0.1 to 1 nanosecond. For optimum performance in the present invention, stretcher designs producing a duration greater than 0.3 nanoseconds should be used. This would suggest the use of pump pulses in the range 0.5 to approximately 3 nsec. An optimum pump pulse duration should be within a range from 1 to 15 times the pulse duration of the stretched pulse. Note that longer pump pulses can be used with a corresponding decrease in overall system efficiency. Pump pulses of 2 nsec duration have been utilized in one embodiment and 10 nsec in another. For a 2 nsec pump pulse duration, the energy of the pulse must be in excess of 400 microjoules. With the crystal adjusted for optimum phase matching, small signal parametric gains in excess of a few thousand are achievable with these conditions in a 15 mm long BBO crystal.

Figure 4:
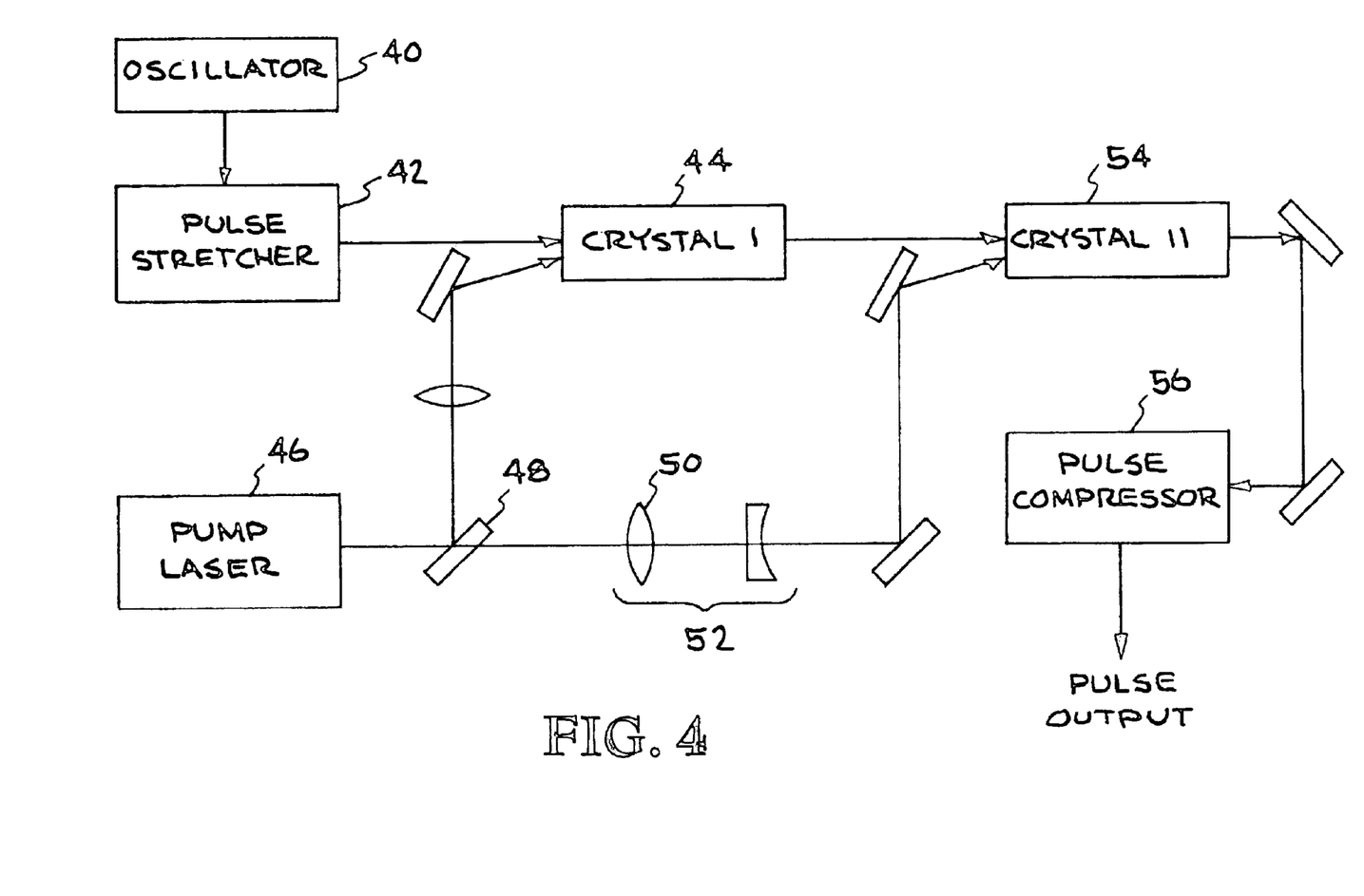
FIG. 4 shows a two-crystal optical parametric amplifier configuration. The first crystal is designed to produce a large small signal gain while the second is designed to achieve maximum energy conversion from the pump beam to the signal.
Figure 5:
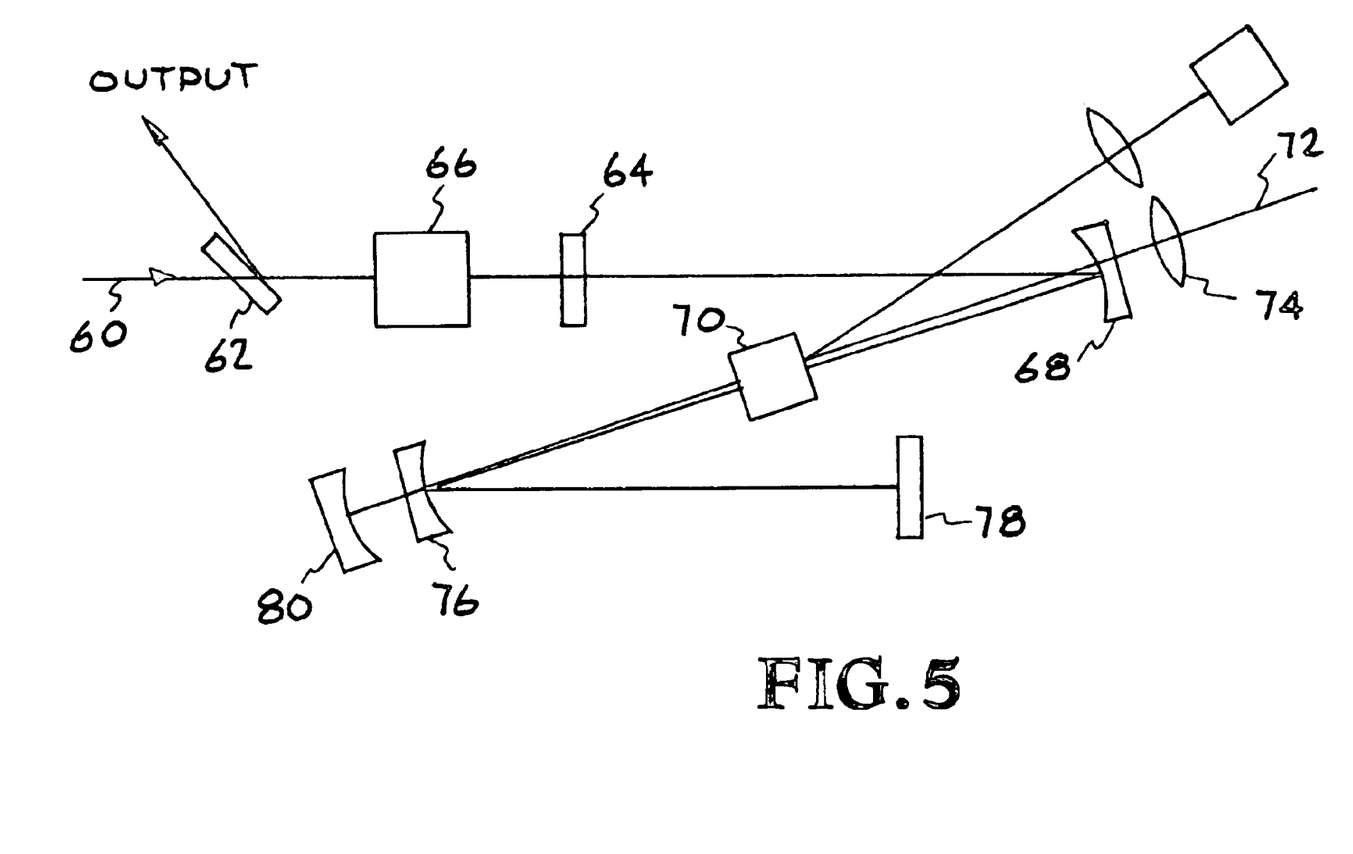
FIG. 5 shows a double-pass single crystal optical parametric amplifier configuration. The first pass is designed to produce a large small signal gain while the second is designed to achieve maximum energy conversion from the pump beam to the signal.
Figure 6:
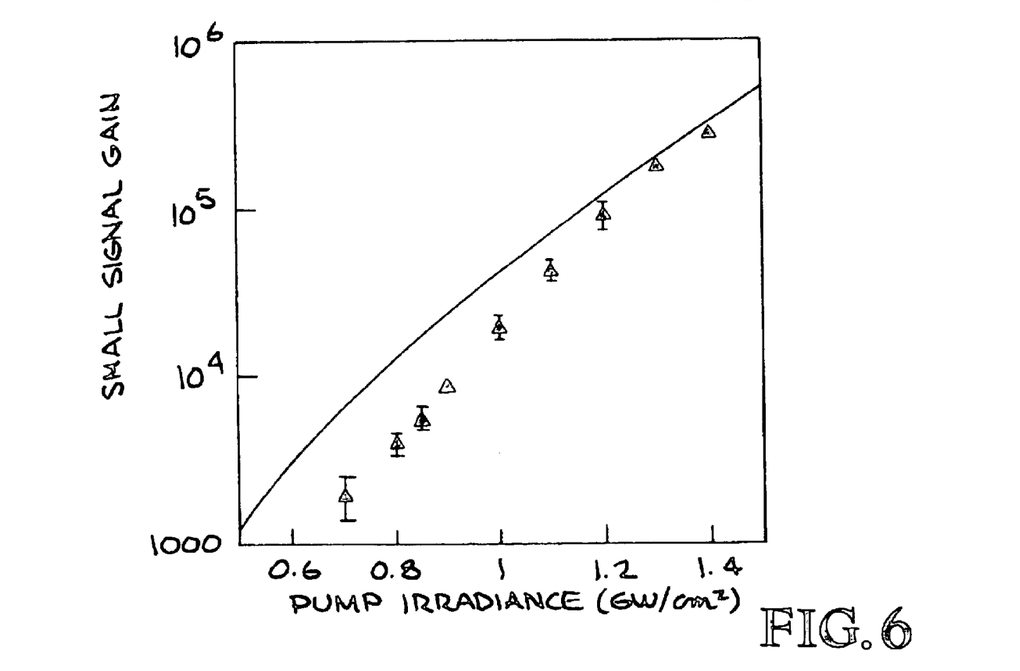
FIG. 6 shows the theoretical (solid line) and experimental data from a two-cystal configuration. The first crystal was BBO cut for type I phase-matching (L=15 mm). The second crystal was also BBO but cut for type II phase matching (L=10 mm). The pump pulse was 532 nm and adjusted to produce the same irradiance in both crystals.

While gains of several thousand from a single crystal have been achieved, the million-fold gain required for millijoule class output from high repetition rate chirped-pulse amplification systems requires either two crystals (FIG. 4) or a double-pass geometry (FIG. 5). In the two-crystal configuration, the pump beam can either be directed through both crystals simultaneously or split into two and directed towards each crystal independently. In both cases, each crystal must be on an independently rotatable stage to set the phase-matching angle for each. Since the first crystal will be operated predominately in the small signal regime and the second crystal in the saturated (pump depleted) regime, one must optimize the crystal length and phase-matching conditions separately for each crystal. Good performance has been obtained when the first crystal is adjusted to provide a gain in the range $10^3$ to $10^5$ (small signal) and the second in the range 10–200 (saturated). This enables an overall gain of the order of $10^6$.

In the embodiment shown in FIG. 4, a short-pulse oscillator 40 produces low energy (typically 0.1 to ≈10 nanojoules) at a pulse duration of 0.01 to 10 psec. These pulses are then stretched in a pulse stretcher 42 that is based on either diffraction gratings or material dispersion with a single-mode fiber. Examples of pulse stretchers are provided in U.S. Pat. No. 5,960,016 titled "Aberration-Free, All-Reflective Laser Pulse Stretcher" by Michael D. Perry et al. The pulse stretcher is designed to stretch the pulse to a duration in the range 0.1 to 3 nsec. This low energy stretched pulse is directed towards the first crystal 44. The beam size may be adjusted by a lens and/or telescope arrangement between the stretcher 42 and the crystal 44. The pump pulses originate from a second laser system 46 and are split into the appropriate energy fraction, e.g., by a conventional thin-film beam splitter 48. The size of the pump beam in each crystal is adjusted, e.g., by a lens 50 and/or telescope 52 between the splitter and each crystal. The pump and signal beams are directed into the crystals at the appropriate phase matching condition. Although other arrangements will perform, satisfactory results are obtainable when the first crystal 44 is set to provide amplification to the range of 1-100 microjoules. The second crystal 54 provides gain to the millijoule level. These pulses are then directed to the pulse compressor 56 or can be further amplified in another parametric amplifier stage or a conventional laser amplifier.

Another embodiment shown in FIG. 5 achieves two crystal performance but by using a single crystal in a double-pass configuration. The oscillator and pulse stretcher are the same as used in FIG. 4. However, after the pulse stretcher, the oscillator pulse 60 passes through a thin-film polarizer 62, a half-waveplate (or 45 degree rotator) 64 and a Faraday rotator 66. The signal beam then strikes a mirror 68 whose curvature is designed to produce the appropriate size of the signal beam within the crystal 70. The pump beam 72 may be designed to pass directly through the mirror by coating the mirror 68 for transmission at the pump wavelength or it may pass the mirror at a slight angle from the signal. The pump beam size is adjusted separately by a lens 74 and/or telescope between the pump laser and the first mirror. Both the pump beam and the signal beam enter the crystal at the appropriate phase matching angle. Following this first pass, the signal beam reflects from another mirror 76 and is directed to a third mirror 78. The second and third mirrors exhibit a curvature designed to produce the appropriate beam size for maximum energy extraction upon passage back through the crystal. The second mirror is coated to transmit the pump beam. The pump beam passes through this mirror and strikes another mirror 80 placed behind. This mirror is a high reflector for the pump wavelength and has a curvature designed to produce the appropriate pump beam size for maximum energy conversion to the signal upon passage back through the crystal. Both the pump beam and the signal beam enter the crystal at the appropriate phase matching angle but are backwards propagating relative to the first pass through the crystal. This configuration allows double-pass amplification through the crystal but in such a manner that each pass may be optimized for maximum gain and utilization of the available pump power. The signal beam then reflects from the first mirror 68 and propagates back through the Faraday rotator 66. The combination of the Faraday rotator 66 and waveplate (or 45 degree quartz rotator) 64 rotates the polarization of the beam such that the beam reflects off the thin-film polarizer 62.

The foregoing description of the invention has been presented for purposes of illustration and description and is not intended to be exhaustive or to limit the invention to the precise form disclosed. Many modifications and variations are possible in light of the above teaching. The embodiments were chosen and described to best explain the principles of the invention and its practical application to thereby enable others skilled in the art to best use the invention in various embodiments and with various modifications suited to the particular use contemplated. The scope of the invention is to be defined by the following claims.

I claim:

1. A method for amplifying a laser pulse, comprising:
providing at least one oscillator pulse from an ultrashort-pulse, mode-locked oscillator;
stretching said at least one oscillator pulse to produce at least one stretched pulse;
directing said at least one stretched pulse onto at least one nonlinear crystal comprising bulk crystalline material;
providing at least one pump pulse from a pump laser system, wherein said at least one pump pulses comprises a pulse duration within a range from 1 to 15 times the pulse duration of said at least one stretched pulse; and
directing said at least one pump pulse onto said at least one nonlinear crystal, wherein said at least one stretched pulse and said at least one pump pulse are operatively directed at said at least one nonlinear crystal and operatively phase matched in said at least one nonlinear crystal to produce at least one amplified output signal pulse.

2. The method of claim 1, wherein said at least one oscillator pulse comprises a plurality of oscillator pulses.

3. The method of claim 1, wherein said at least one oscillator pulse has an energy within a range from about 0.1 to about 10 nanojoules.

4. The method of claim 1, wherein said at least one oscillator pulse has a pulse duration of 0.01 to 20 psec.

5. The method of claim 1, wherein the step of stretching said at least one oscillator pulse is carried out with a pulse stretcher based on either diffraction gratings or material dispersion with a single-mode fiber.

6. The method of claim 1, wherein the step of stretching said at least one oscillator pulse is carried out with a pulse stretcher designed to stretch said at least one oscillator pulse to a pulse duration within a range from 0.04 to 4 nsec.

7. The method of claim 1, further comprising adjusting the beam area of said at least one stretched pulse and said pump pulse to an area appropriate to achieve a large parametric gain for the length of said at least one nonlinear crystal.

8. The method of claim 1, wherein said at least one nonlinear crystal comprises bulk crystalline material exhibiting a second order nonlinear susceptibility.

9. The method of claim 8, wherein said at least one nonlinear crystal comprises nonlinear borate material.

10. The method of claim 9, wherein said nonlinear borate material is selected from the group consisting of Beta-Barium borate (BBO) and lithium borate (LBO).

11. The method of claims 8, wherein said at least one nonlinear crystal comprises nonlinear phosphate material.

12. The method of claim 11, wherein said nonlinear phosphate material is selected from the group consisting of potassium-dihydrogen phosphate (KDP) and potassium titanyl phosphate (KTP).

13. The method of claim 8, wherein said at least one nonlinear crystal comprises bulk crystalline material selected from the group consisting of Lithium Niobate and Gadolinium-YCOB.

14. The method of claim 1, wherein said short-pulse pump laser system is capable of providing at least one pump pulse having a pulse duration of less than approximately ten times the duration of the stretched pulse.

15. The method of claim 1, wherein the step of providing at least one pump pulse includes providing a plurality of pump pulses at a repetition rate within a range from 10 Hz to 100 kHz.

16. The method of claim 1, wherein said at least one nonlinear crystal comprises at least a first nonlinear crystal and a second nonlinear crystal in series with said first nonlinear crystal, wherein said first nonlinear crystal produces at least one first amplified signal pulse, said method further comprising directing said at least one first amplified signal pulse onto said second nonlinear crystal, wherein said second nonlinear crystal produces said at least one amplified output signal pulse.

17. The method of claim 16, wherein said at least one pump pulse is split into an appropriate energy fraction by a conventional thin-film beam splitter.

18. The method of claim 16, wherein the size of said at least one pump pulse is adjusted by a lens or a telescope.

19. The method of claim 16, wherein said first nonlinear crystal is set to provide amplification to the range of 1–100 microjoules and wherein said second nonlinear crystal is set to provide amplification to an energy greater than approximately one millijoule.

20. The method of claim 1, further comprising compressing said at least one signal pulse.

21. The method of claim 1, wherein said at least one nonlinear crystal comprises a single nonlinear crystal, wherein said at least one stretched pulse and said at least one pump pulse are twice operatively directed at said single nonlinear crystal and twice operatively phase matched in said single nonlinear crystal to produce at least one amplified output signal pulse.

22. The method of claim 21, wherein said at least one stretched pulse and said at least one pump pulse are independently adjusted on each pass through said single nonlinear crystal.

23. The method of claim 1, wherein said at least one pump pulse comprises a pump irradiance $I_p$, wherein said nonlinear crystal comprises an interaction length, wherein the product of said pump irradiance and said interaction length, $I_pL$, is set to be within the range of 0.1 GW/cm to approximately 2 GW/cm.

24. The method of claim 1, wherein said method further comprises adjusting said peak irradiance in said nonlinear crystal to be within the range of $0.1 \times 10^9$ W/cm$^2$ to $2 \times 10^9$ W/cm$^2$.

25. The method of claim 24, wherein said nonlinear crystal comprises a length within the range from 0.5 cm to 2.5 cm.

26. The method of claim 1, wherein said at least one pump pulse comprises a spot size set from the Rayleigh range of a TEM$_{00}$ laser beam, $z_0 = 2ow_o^2/o$ where, $w_o$ is the radius of the beam at the $1/e^2$ irradiance point and o is the wavelength of the pump beam, wherein said minimum beam waist adjusted by the M$^2$ formalism, e.g., the beam quality can be described by a parameter, M$^2$ such that the beam will propagate approximately as a Gaussian beam but with a minimum waist of $w_{actual} = M^2 w_o$.

27. The method of claim 1, wherein said at least one pump pulse comprises a beam waist set to approximately two to three times the waist of the signal beam.

28. The method of claim 16, wherein said first nonlinear crystal is operated predominately in the small signal regime and said second nonlinear crystal is operated in the saturated regime.

29. The method of claim 28, wherein said first nonlinear crystal is adjusted to provide a gain within the range of $10^3$ to $10^5$ and wherein said second nonlinear crystal is adjusted to provide a gain within the range of 10–200.

30. The method of claim 1, wherein said at least one nonlinear crystal comprises a single nonlinear crystal, wherein said at least one stretched pulse and said at least one pump pulse each pass through said single nonlinear crystal for a first pass and a second pass, wherein said nonlinear crystal is operated predominately in the small signal regime for said first pass and operated in the saturated (pump depleted) regime for said second pass.

31. The method of claim 30, wherein said single nonlinear crystal is adjusted to provide a gain on said first pass within the range of $10^3$ to $10^5$ and wherein said single nonlinear crystal is adjusted to provide a gain on said second pass within the range of 10–200.

32. An apparatus for amplifying a laser pulse, comprising:
an ultrashort-pulse, mode-locked oscillator for providing at least one oscillator pulse;
a pulse stretcher for stretching said at least one oscillator pulse to produce at least one stretched pulse;
at least one nonlinear crystal comprising bulk crystalline material;
optics configured for directing said at least one stretched pulse onto said at least one nonlinear crystal;
a short-pulse pump laser system for providing at least one pump pulse; and
optics configured for directing said at least one pump pulse onto said at least one nonlinear crystal, wherein said at least one stretched pulse and said at least one pump pulse are operatively directed at said at least one nonlinear crystal and operatively phase matched in said at least one nonlinear crystal to produce at least one amplified output signal pulse.

33. The apparatus of claim 32, wherein said at least one nonlinear crystal comprises bulk crystalline material exhibiting a second order nonlinear susceptibility.

34. The apparatus of claim 33, wherein said at least one nonlinear crystal comprises nonlinear borate material.

35. The apparatus of claim 34, wherein said nonlinear borate material is selected from the group consisting of Beta-Barium borate (BBO) and lithium borate (LBO).

36. The apparatus of claims 33, wherein said at least one nonlinear crystal comprises nonlinear phosphate material.

37. The apparatus of claim 36, wherein said nonlinear phosphate material is selected from the group consisting of potassium-dihydrogen phosphate (KDP) and potassium titanyl phosphate (KTP).

38. The apparatus of claim 33, wherein said at least one nonlinear crystal comprises bulk crystalline material selected from the group consisting of Lithium Niobate and Gadolinium-YCOB.

39. The method of claim 32, wherein said at least one nonlinear crystal comprises at least a first nonlinear crystal and a second nonlinear crystal in series with said first nonlinear crystal, wherein said first nonlinear crystal produces at least one first amplified signal pulse, said apparatus further comprising optics for directing said at least one first amplified signal pulse onto said second nonlinear crystal, wherein said second nonlinear crystal produces said at least one amplified output signal pulse.

40. The apparatus of claim 33, further comprising a pulse compressor for compressing said at least one signal pulse.

41. The apparatus of claim 32, wherein said at least one nonlinear crystal comprises a single nonlinear crystal, wherein said at least one stretched pulse and said at least one pump pulse are twice operatively directed at said single nonlinear crystal and twice operatively phase matched in said single nonlinear crystal to produce at least one amplified output signal pulse.

42. The apparatus of claim 32, wherein said at least one pump pulse comprises a pump irradiance $I_p$, wherein said nonlinear crystal comprises an interaction length, wherein the product of said pump irradiance and said interaction length, $I_pL$, is set to be within the range of 0.1 GW/cm to approximately 2 GW/cm.

43. An apparatus for amplifying a laser pulse, comprising:
an ultrashort-pulse, mode-locked oscillator for providing at least one oscillator pulse;
a pulse stretcher positioned to stretch said at least one oscillator pulse to produce at least one stretched pulse;
at least one nonlinear crystal comprising bulk crystalline material positioned to receive said at least one stretched pulse; and
a pump laser system for providing at least one pump pulse, wherein said at least one pump pulses comprises a pulse duration within a range from 1 to 15 times the pulse duration of said at least one stretched pulse, wherein said at least one nonlinear crystal is positioned to receive said at least one stretched pulse, wherein said at least one stretched pulse and said at least one pump pulse are operatively phase matched in said at least one nonlinear crystal to produce at least one amplified output signal pulse.

44. The apparatus of claim 43, wherein said oscillator is capable of producing said at least one oscillator pulse such that it has an energy within a range from about 0.1 to about 10 nanojoules.

45. The apparatus of claim 43, wherein said oscillator is capable of producing said at least one oscillator pulse such that it has a pulse duration of 0.01 to 20 psec.

46. The apparatus of claim 43, wherein said pulse stretcher comprises an element selected from the group consisting of a diffraction grating and a single-mode fiber.

47. The apparatus of claim 43, wherein said pulse stretcher is designed to stretch said at least one oscillator pulse to a pulse duration within a range from 0.04 to 4 nsec.

48. The apparatus of claim 43, further comprising means for adjusting the beam area of said at least one stretched pulse and said pump pulse to an area appropriate to achieve a large parametric gain for the length of said at least one nonlinear crystal.

49. The apparatus of claim 43, wherein said at least one nonlinear crystal comprises bulk crystalline material exhibiting a second order nonlinear susceptibility.

50. The apparatus of claim 49, wherein said at least one nonlinear crystal comprises nonlinear borate material.

51. The apparatus of claim 50, wherein said nonlinear borate material is selected from the group consisting of Beta-Barium borate (BBO) and lithium borate (LBO).

52. The apparatus of claims 49, wherein said at least one nonlinear crystal comprises nonlinear phosphate material.

53. The apparatus of claim 52, wherein said nonlinear phosphate material is selected from the group consisting of potassium-dihydrogen phosphate (KDP) and potassium titanyl phosphate (KTP).

54. The apparatus of claim 49, wherein said at least one nonlinear crystal comprises bulk crystalline material selected from the group consisting of Lithium Niobate and Gadolinium-YCOB.

55. The apparatus of claim 43, wherein said short-pulse pump laser system is capable of providing at least one pump pulse having a pulse duration of less than approximately ten times the duration of the stretched pulse.

56. The apparatus of claim 43, wherein said pump laser is capable of providing a plurality of pump pulses at a repetition rate within a range from 10 Hz to 100 kHz.

57. The apparatus of claim 43, wherein said at least one nonlinear crystal comprises at least a first nonlinear crystal and a second nonlinear crystal in series with said first nonlinear crystal, wherein said first nonlinear crystal produces at least one first amplified signal pulse, said apparatus further comprising means for directing said at least one first amplified signal pulse onto said second nonlinear crystal, wherein said second nonlinear crystal produces said at least one amplified output signal pulse.

58. The apparatus of claim 57, further comprising a thin-film beamsplitter for splitting said at least one pump pulse into an appropriate energy fraction.

59. The apparatus of claim 43, further comprising a compressor for compressing said at least one signal pulse.

60. The apparatus of claim 43, wherein said at least one nonlinear crystal comprises a single nonlinear crystal, further comprising means for twice directing said at least one stretched pulse and said at least one pump pulse at said single nonlinear crystal to produce at least one amplified output signal pulse.

61. The apparatus of claim 60, further comprising means for independently adjusting said at least one stretched pulse and said at least one pump pulse on each pass through said single nonlinear crystal.

62. The apparatus of claim 43, wherein said at least one pump pulse comprises a pump irradiance $I_p$, wherein said nonlinear crystal comprises an interaction length, wherein the product of said pump irradiance and said interaction length, $I_pL$, is set to be within the range of 0.1 GW/cm to approximately 2 GW/cm.

63. The apparatus of claim 43, wherein said nonlinear crystal comprises a length within the range from 0.5 cm to 2.5 cm.

64. The apparatus of claim 43, wherein said at least one nonlinear crystal comprises a single nonlinear crystal, wherein said at least one stretched pulse and said at least one pump pulse each pass through said single nonlinear crystal for a first pass and a second pass, wherein said nonlinear crystal is operated predominately in the small signal regime for said first pass and operated in the saturated (pump depleted) regime for said second pass.

* * * * *